(12) United States Patent
Tsfaty et al.

(10) Patent No.: US 8,189,456 B2
(45) Date of Patent: May 29, 2012

(54) APPARATUS FOR AND METHOD OF MINIMIZING BACKOFF FOR ORTHOGONAL FREQUENCY DIVISION MULTIPLEXING TRANSMISSION

(75) Inventors: Yossi Tsfaty, Rishon Le Zion (IL); Ofer Friedman, Ganey Tikva (IL); Itay Sherman, Ra,anana (IL); Avi Baum, Givat-Shmuel (IL)

(73) Assignee: Texas Instruments Incorporated, Dallas, TX (US)

( * ) Notice: Subject to any disclaimer, the term of this patent is extended or adjusted under 35 U.S.C. 154(b) by 1030 days.

(21) Appl. No.: 11/669,326

(22) Filed: Jan. 31, 2007

(65) Prior Publication Data
US 2007/0223365 A1     Sep. 27, 2007

Related U.S. Application Data

(60) Provisional application No. 60/784,272, filed on Mar. 21, 2006.

(51) Int. Cl.
*H04J 11/00* (2006.01)
*H04L 27/00* (2006.01)
*H03M 13/00* (2006.01)

(52) U.S. Cl. .................... 370/210; 375/295; 714/755
(58) Field of Classification Search .............. 370/281, 370/282, 430, 203–210, 335, 480, 491; 375/260–267, 345, 347, 348, 141–142, 146, 375/296–299; 714/707, 748, 755, 758, 780, 714/798

See application file for complete search history.

(56) References Cited

U.S. PATENT DOCUMENTS

| | | | |
|---|---|---|---|
| 7,313,373 B1 * | 12/2007 | Laskharian et al. | 455/127.1 |
| 2002/0172184 A1 * | 11/2002 | Kim et al. | 370/344 |
| 2004/0093545 A1 * | 5/2004 | Khandani et al. | 714/746 |
| 2004/0141458 A1 * | 7/2004 | Park et al. | 370/208 |
| 2005/0052990 A1 * | 3/2005 | Lomnitz | 370/208 |
| 2008/0019453 A1 * | 1/2008 | Zhao et al. | 375/260 |
| 2010/0020897 A1 * | 1/2010 | Moffatt et al. | 375/295 |

* cited by examiner

*Primary Examiner* — Aung S Moe
*Assistant Examiner* — Habte Mered
(74) *Attorney, Agent, or Firm* — Ronald O. Neerings; Wade James Brady, III; Frederick J. Telecky, Jr.

(57) ABSTRACT

A novel and useful mechanism for reducing the required backoff and the peak to average power ratio (PAPR) needed for an OFDM transmitter whiles still meeting spectral mask and EVM specifications. The mechanism searches, for each packet to be transmitted, for several possible scrambler and encryption sequences that would yield the best spectral mask and EVM with lowest PAPR. The search can be performed using the existing transmitter and receiver PHY circuit chain to modulate and demodulate the candidate hypotheses. Once the scrambler sequence and/or encryption sequence is selected, the packet is transmitted using the selected scrambler and encryption sequences. In addition, the invention exploits the fact that even for very low backoff margins, a reduced number of candidate hypotheses may be tested while still yielding a high probability of meet the spectral mask and EVM specifications.

21 Claims, 9 Drawing Sheets

APPARATUS FOR AND METHOD OF MINIMIZING BACKOFF FOR ORTHOGONAL FREQUENCY DIVISION MULTIPLEXING TRANSMISSION

REFERENCE TO PRIORITY APPLICATION

This application claims priority under 35 U.S.C. §119(e) to U.S. Provisional Application Ser. No. 60/784,272, filed Mar. 21, 2006, entitled "Reduced backoff scheme for QAM constellation-scheme OFDM to improve range," incorporated herein by reference in its entirety.

FIELD OF THE INVENTION

The present invention relates to the field of data communications and more particularly relates to an apparatus for and method of minimizing the required backoff for orthogonal frequency division multiplexing (OFDM) transmission schemes.

BACKGROUND OF THE INVENTION

Orthogonal frequency division multiplexing (OFDM) is a well known communications technique that divides a communications channel into a number of equally spaced frequency bands. A subcarrier carrying a portion of the user information is transmitted in each band. Each subcarrier is orthogonal (i.e. independent of each other) with every other subcarrier, differentiating OFDM from commonly used frequency division multiplexing (FDM). OFDM (also known as multitone modulation) is presently used in a number of commercial wired and wireless applications. In wired applications, it is used in digital subscriber line (DSL) systems. In wireless applications, OFDM is used in television and broadcast radio such as the European digital broadcast television standard as well as in digital radio in North America. OFDM is also used in fixed wireless systems and wireless local-area network (WLAN) products. A system based on OFDM has been developed to deliver mobile broadband data service (WiMAX) at relatively high data rates.

OFDM systems are effectively a combination of modulation and multiple-access schemes that segments a communications channel in such a way that many users can share it. Whereas TDMA segments are divided according to time and CDMA segments are divided according to spreading codes, OFDM segments are divided according to frequency. It is a technique that divides the spectrum into a number of equally spaced tones (or frequencies) and carries a portion of a user's information on each tone. Although OFDM can be viewed as a form of frequency division multiplexing (FDM), it has the property that each tone is orthogonal to each other. FDM typically requires there to be frequency guard bands between the frequencies so that they do not interfere with each other. In contrast, OFDM permits the spectrum of each tone to overlap, but because they are orthogonal, they do not interfere with each other. By allowing the tones to overlap, the overall amount of spectrum required is reduced significantly OFDM enables user data to be modulated onto the tones. The information is modulated onto a tone by adjusting the phase and/or amplitude of the tone. In the most basic form, a tone may be present or absent to indicate a single bit of information. Normally, however, either phase shift keying (PSK) or quadrature amplitude modulation (QAM) is typically employed. An OFDM system takes a data stream and splits it into N parallel data streams, each at a rate 1/N of the original rate. Each stream is then mapped to a tone at a unique frequency and combined together using the inverse fast Fourier transform (IFFT) to yield the time-domain waveform to be transmitted.

OFDM is a multiple-access technique since an individual tone or groups of tones can be assigned to different users. Multiple users share a given bandwidth, yielding an OFDMA system. Each user is assigned a predetermined number of tones when they have information to send. Alternatively, a user is assigned a variable number of tones based on the amount of information they need to send. The assignments are controlled by the media access control (MAC) layer, which schedules the resource assignments based on user demand.

OFDM can be combined with frequency hopping to create a spread spectrum system, realizing the benefits of frequency diversity and the interference averaging of CDMA. OFDM thus provides the best of the benefits of TDMA in that users are orthogonal to one another, and of CDMA, while avoiding the limitations of each, including the need for TDMA frequency planning and equalization, and multiple access interference in the case of CDMA.

The sinusoidal waveforms making up the tones in OFDM have the property of being the only Eigenfunctions of a linear channel. This property prevents adjacent tones in OFDM systems from interfering with one another. This property, and the incorporation of a small amount of guard time to each symbol, enables the orthogonality between tones to be preserved in the presence of multipath. This is what enables OFDM to avoid the multiple-access interference that is present in CDMA systems.

Considering the frequency domain representation of a number of tones, the peak of each tone corresponds to a zero level, or null, of every other tone. The result of this is that there is no interference between tones. When the receiver samples at the center frequency of each tone, only the energy of the desired signal is present, in addition to any noise that happens to be in the channel.

To maintain orthogonality between tones, it is necessary to ensure that the symbol time contains one or multiple cycles of each sinusoidal tone waveform. Normally this is the case since the system is constructed such that tone frequencies are integer multiples of the symbol period where the tone spacing is 1/T.

Note that in order to generate a pure sinusoidal tone, the signal must start at time minus infinity. This is important, because tones are the only waveform than can ensure orthogonality. The channel response, however, can be treated as finite, because multipath components decay over time and the channel is effectively band-limited. By adding a guard time, called a cyclic prefix, the channel can be made to behave as if the transmitted waveforms were from time minus infinity thus ensuring orthogonality, which essentially prevents one subcarrier from interfering with another, which is called intercarrier interference or ICI.

The cyclic prefix is a copy of the last portion of the data symbol appended to the front of the symbol during the guard interval. Multipath causes tones and delayed replicas of tones to arrive at the receiver with some delay spread. This leads to misalignment between sinusoids, which need to be aligned to be orthogonal. The cyclic prefix allows the tones to be realigned at the receiver, thus regaining orthogonality.

The cyclic prefix is sized appropriately to serve as a guard time to eliminate ISI. This is accomplished because the amount of time dispersion from the channel is smaller than the duration of the cyclic prefix. A fundamental trade-off is that the cyclic prefix must be long enough to account for the anticipated multipath delay spread experienced by the system. The amount of overhead increases, as the cyclic prefix gets longer. The sizing of the cyclic prefix forces a tradeoff between the amount of delay spread that is acceptable and the amount of Doppler shift that is acceptable.

An OFDM signal is the sum of N independent QAM symbols mapped onto N different subchannels with 1/T frequency separation where T is the OFDM symbol period. The discrete time-domain samples $b^i = (b_0^i, b_1^i, \ldots, b_{N-1}^i)$ to be transmitted are obtained via an N-point inverse Fast Fourier Transform (IFFT) from the complex QAM symbols block $a^i = (a_0^i, a_1^i, \ldots, a_{N-1}^i)$ as follows $$b_n^i = \frac{1}{\sqrt{N}} \sum_{m=0}^{N-1} a_m^i e^{j2\pi mn/N} \quad (1)$$

where $a_m^i$ is the QAM data symbol sent on the $m^{th}$ subcarrier of the $i^{th}$ OFDM symbol. A cyclic prefix is appended. Prior to passing through the PA, the OFDM signal undergoes D/A conversion and subsequently analog filtering and is mapped on a carrier frequency. For large N, the time domain samples $b_m^i$ have a zero mean Gaussian distribution, as they are weighted sums of independent identically distributed random variables (the frequency domain QAM symbols $a_n^i$. A small percentage of these time domain samples are thus susceptible to having high magnitudes at the tail of the distribution. These high magnitude samples cause the PAPR problem in OFDM. Mathematically, the PAPR of an OFDM block of digital samples $b = (b_0, b_1, \ldots, b_{N-1})$ is defined as follows $$PAPR(b) = \frac{\max_{0 \le n \le N-1} |b_n|^2}{E\{\|b\|^2\}/N} \quad (2)$$

where $\|\cdot\|$ denotes the Euclidean norm of the enclosed vector.

Today, there are both numerous wireless communication devices and wireless communication standard that make use of Orthogonal Frequency Division Multiplexing (OFDM) to carry high data rate traffic over a wireless channel. OFDM links are very robust to multipath fading conditions thus ensuring the required quality of service even under severe wireless channel conditions. Applications like Wireless LAN (WLAN), WiMAX and the upcoming 3G-LTE make wide use of OFDM as their transmission scheme.

As described supra, OFDM transmission uses a large number of subcarriers (often referred to as tones or bins), with orthogonal frequency separation between them, to carry the required information over the air. Modulation is often implemented using an IFFT while demodulation is performed using an FFT. The Wireless LAN (802.11.g) specification uses 52-56 subcarriers while the WiMAX make specification uses as many as 2048 subcarriers.

As the number of subcarriers increases, however, the probability of having higher voltage peaks as compared to the average power increases with a theoretical dependence of Peak=log(Number of tones) (3)

Figure 1:
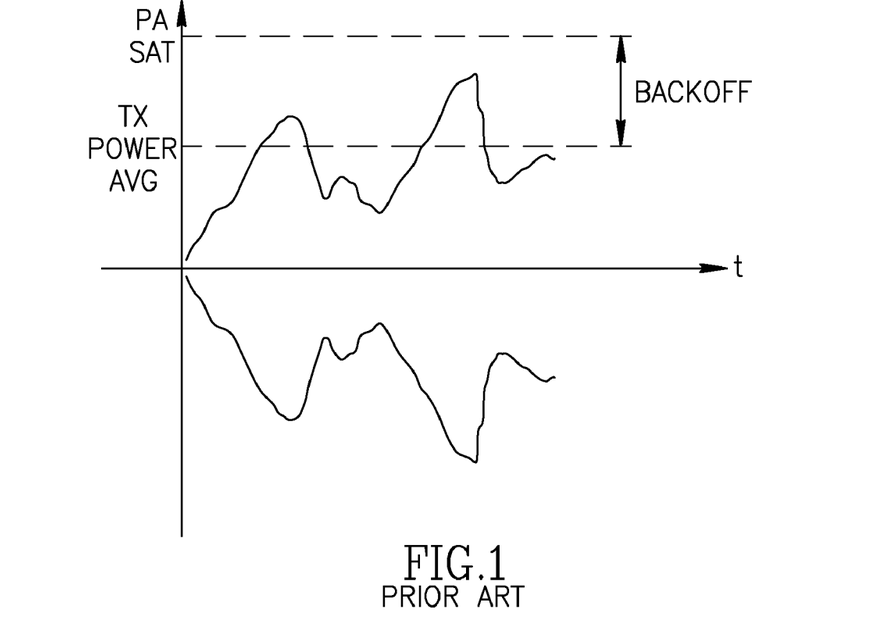
FIG. 1 is a diagram illustrating the definition of backoff for an example OFDM transmission.
Figure 2:
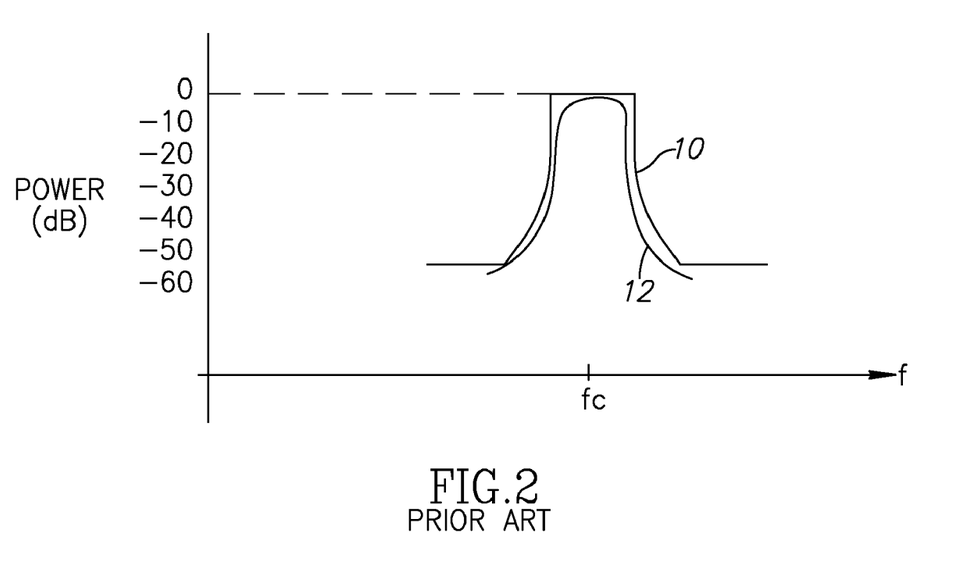
FIG. 2 is a diagram illustrating an example of a spectral mask.

The ratio between the maximum possible peak power to the average power is defined as the Peak to Average Power Ratio (PAPR). Another important aspect of the ratio between the peak power and average power of an OFDM transmission scheme is the amount of margin needed between the saturation point of the power amplifier (PA) to the average transmitted power of an OFDM scheme. The margin between the output saturation power of the PA to the average transmitted power at the PA output is referred to as backoff and is typically expressed in units of dB. A diagram illustrating the backoff for an example OFDM transmission signal is shown in FIG. 1. The backoff has a high correlation to the spectral mask and the error vector magnitude (EVM) at the output of the PA. Note that the EVM expresses the noise floor of the transmitter. As the backoff value increases, the spectral mask and EVM improve as well. An example spectral mask is shown in FIG. 2 wherein the frequency domain representation of the OFDM transmission signal 12 must meet the spectral mask constraint 10 as dictated by the relevant wireless standard.

OFDM transmitters often use different constellations depending on the available signal to noise ratio (SNR) at the receiver. This means that when the SNR at the receiver is low, the transmitter adjusts the constellation (i.e. often referred as 'modulation format') carried by all the OFDM subcarriers to be more robust, such as a simple scheme of BPSK often in combination with a strong error correcting code (ECC). When the SNR at the receiver is high, the transmitter uses a constellation of 64 QAM (often with lower ECC protection). This process is called 'rate fallback' in WLAN applications.

When the modulation format is simple (e.g., BPSK) the required EVM of the transmitter is likely high (e.g., −8 dB). Conversely, when the modulation format is complex, the required EVM of the transmitter is low (e.g., −25 dB). The spectral mask limitation of the transmitter, however, remains the same for all the modulation formats. This is why when the transmitter uses a simple modulation format such as BPSK it is limited by spectral mask constraints and not by the EVM, while for complicated modulation formats like 64 QAM, it is limited by the EVM. In WLAN applications with a typical PA, most transmitters use a backoff ratio of 8 dB for the QAM 64modulation format, while using a backoff of only 4 dB for BPSK modulation (since with BPSK, the transmitter is limited by spectral mask requirements and not by EVM requirements.

The high peak-to-average power ratio (PAPR) characterizing OFDM forces a reduction in the average power at the output of the power amplifier used in the transmitter. This is because the input signal to the PA must lie in the linear region of the PA, well below the saturation point. The increased linear dynamic range requirements typically translate to the need to use more costly PAs.

One way to avoid the extremely high backoff values and costly amplifiers of OFDM, occasional clipping and/or soft thresholding are allowed. This, however, leads to inband distortion that increases the bit error rate (BER) and causes spectral widening that increases adjacent channel interference.

Several OFDM PAPR reduction techniques have been suggested in the prior art, all of which attempt to reduce the required PA backoff and the effects of its nonlinearity. The various approaches are quite different from each other and impose different constraints.

In one prior art approach, several bits or bit sequences are used to carry a particular code that minimizes the PAPR of the resulting transmitted signal. The disadvantage, however, is that the data rate is reduced along with the PAPR. Other methods suggest using phase manipulations, such as selective mapping (SLM), partial transmit sequences (PTS) and random phasor. Although effective, these methods suffer from the disadvantages of high complexity and requiring coded side information to be transmitted. This causes problems in terms of compliance with wireless specifications.

Other methods such as tone reservation propose inserting anti-peak signals in unused or reserved subcarriers. Although the method does not cause any inband distortion, it does reduce the useful data rate. Although suited in some implementations (e.g., IEEE 802.16e), it is not always standards compliant (e.g., the bandwidth sacrifice required by this method is not permitted in IEEE 802.16d).

Other prior art approaches suggest altering the QAM constellation in order to reduce high signal peaks. The technique of tone injection relies on the principle of constellation expansion. It involves a complex optimization process, however, that makes it unattractive for systems with large numbers of subcarriers.

Additional prior art constellation extension methods have been suggested. Active constellation extension (ACE) allows the corner QAM constellation points to be moved within the quarter planes outside their nominal values. The other border points are allowed to be displaced along rays pointing towards the exterior of the constellation. The interior points are not modified, in order to preserve the minimum distance between the constellation symbols.

Further, a non-iterative PAPR reduction method relying on metric based symbol predistortion (MBSP) has been suggested. In this scheme, a predetermined number of corner constellation symbols are multiplied with a real valued constant greater than unity. A cost function then determines which symbols are to be modified. This algorithm is not recursive and it does not require the transmission of any side information. The number of symbols to be modified and the real-values expansion factor are predetermined by means of simulation.

It is thus desirable to have a mechanism that is capable of reducing or minimizing the backoff of an OFDM transmitter that does not suffer from the disadvantages of the prior art schemes described hereinabove. In addition, the reduced backoff mechanism should be flexible enough to enable reducing the required backoff while meeting any spectral mask and EVM constraints imposed by a wireless standard. Further, the reduced backoff mechanism preferably does not require changes to existing transmission formats or to the transmitter PHY hardware.

SUMMARY OF THE INVENTION

The present invention is a novel and useful apparatus for and method of reducing the backoff required for OFDM based transmitters. In wireless communication links using OFDM schemes, a large Backoff is required to maintain acceptable spectral mask and a good EVM. The reduced backoff mechanism is operative to reduce the backoff required while meeting spectral mask and EVM requirements imposed by wireless standards, for example. Reducing the required backoff thus permits both higher wireless range and reduced power consumption thus significantly improving battery life.

In operation, for each data packet to be transmitted, the mechanism of the invention is operative to scan (i.e. search) for scrambler sequences and/or encryption sequences that yields a minimum peak to average output value while maintaining acceptable spectral mask and EVM properties. The minimum peak to average value corresponds to the minimum backoff value. Once the optimum scrambler/encryption sequence is found, it is used in transmission of the packet. The mechanism utilizes the existing hardware in the transmit and receive PHY circuits.

The invention comprises a standards based mechanism, meaning it is applicable for any wireless communication standard that utilizes OFDM. In communication devices constructed by the inventors incorporating the mechanism of the present invention, a reduction by as much as 2.2 dB in backoff was achieved.

It is noted that although the invention is applicable to any type of OFDM transmission system, it is particularly well suited for use with the low modulation formats of OFDM, e.g., BPSK, etc. This is because it is easy to gain spectral mask margin using a simple different scrambling sequence than to gain EVM.

Although the mechanism of the present invention can be used in numerous types of communication systems, to aid in illustrating the principles of the present invention, the description of the reduced backoff mechanism is provided in the context of an OFDM based communication device. The reduced backoff mechanism of the present invention can be incorporated in a communication device such a multimedia player, cellular phone, PDA, etc. Although the invention is described in the context of a cellular phone, it is appreciated that the invention is not limited to the example applications presented, but that one skilled in the art can apply the principles of the invention to other communication systems as well (both wireless and wired) without departing from the scope of the invention.

The reduced backoff mechanism has several advantages including the following: (1) the mechanism is a standards based solution and hence is applicable to any OFDM standard or application; (2) the mechanism is applicable to any OFDM modulation without requiring any changes to existing standards (i.e. does not require any special messaging); (3) the mechanism does not require any hardware changes since it uses the same TX chain of conventional OFDM transmitters; (4) the mechanism can be implemented for short packet transmission within any OFDM transmitter with relatively low latency (processing required only to determine the sequence); and (5) use of the mechanism does not degrade forward error correction (FEC) capabilities since the mechanism does not search for the best codeword that yields the lowest PAPR.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is therefore provided in accordance with the invention, a method of minimizing backoff for use in a transmitter, the method comprising the steps of scanning a plurality of sequence hypotheses, for each sequence hypothesis, calculating a transmit circuit output signal and peak to average value thereof and selecting the sequence that yields a minimum peak to average value.

There is also provided in accordance with the invention, a method of minimizing backoff for use in a transceiver incorporating a transmitter and receiver, the method comprising the steps of first scanning a plurality of sequence hypotheses, for each sequence hypothesis, first calculating a transmit circuit output signal and peak to average value thereof, selecting the sequence that yields a minimum peak to average value, for the selected sequence, second scanning all possible gain value hypotheses, for each gain hypothesis, second calculating a receiver output signal and measuring the spectral mask and error vector magnitude (EVM) thereof and selecting the maximum gain that does not violate spectral mask and EVM requirements.

There is further provided in accordance with the invention, a method of minimizing backoff for use in a transceiver incorporating a transmitter and receiver, the method comprising the steps of first scanning a plurality of sequence hypotheses, second scanning a plurality of gain value hypotheses, for each gain hypothesis, first calculating a receiver output signal and measuring the spectral mask and error vector magnitude (EVM) thereof, selecting the maximum gain that does not violate spectral mask and EVM requirements and selecting the sequence that yields the maximum gain.

There is also provided in accordance with the invention, an apparatus for minimizing backoff in a transmitter comprising a coder operative to generate a bitstream from an input data packet in accordance with a sequence input thereto, a transmit circuit coupled to the coder, a peak to average calculator operative to calculate a peak to average value of the output of the transmit circuit and means for scanning a plurality of sequences through the coder and selecting the sequence that yields a minimum peak to average value.

An apparatus for minimizing backoff in a transceiver having a transmitter and a receiver comprising a coder operative to generate a bitstream from an input data packet in accordance with a sequence input thereto, the bitstream input to the transmitter, a peak to average calculator operative to calculate a peak to average value of the output of the transmitter, a gain multiplier coupled to the output of the transmitter and operative to generate a gain adjusted signal in accordance with a gain value applied thereto, a table operative to generate a table output from the gain adjusted signal in accordance a model of the input/output characteristics of a power amplifier portion of the transmitter, the table output input to the receiver, means for measuring a spectral mask and error vector magnitude (EVM) of the output of the receiver and means for scanning a plurality of sequences through the coder and a plurality of gain values through the gain multiplier and selecting the sequence and maximum value that yields acceptable spectral mask and EVM.

There is further provided in accordance with the invention, a mobile communications device comprising a cellular radio, an orthogonal frequency division multiplexing (OFDM) transmitter comprising a scrambler, an OFDM receiver, a processor coupled to the transmitter and the receiver, the processor operative to scan a plurality of scrambler sequence hypotheses, for each scrambler sequence hypothesis, calculate a transmit circuit output signal and peak to average value thereof, select the scrambler sequence that yields a minimum peak to average value, for the selected scrambler sequence, scan all possible gain value hypotheses, for each gain hypothesis, calculate a receiver output signal and measure the spectral mask and error vector magnitude (EVM) thereof, select the maximum gain that yields acceptable spectral mask and EVM and means for transmitting packets via the transmitter utilizing the selected scrambler sequence and selected gain value.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| AC | Alternating Current |
| ACE | Active Constellation Extension |
| AM | Amplitude Modulation |
| ASIC | Application Specific Integrated Circuit |
| AVI | Audio Video Interleave |
| BER | Bit Error Rate |
| BMP | Windows Bitmap |
| BPSK | Binary Phase Shift Keying |
| CDMA | Code Division Multiple Access |
| CPU | Central Processing Unit |
| D/A | Digital to Analog Converter |
| DC | Direct Current |
| DSL | Digital Subscriber Loop |
| DSP | Digital Signal Processor |
| ECC | Extended Country Code |
| EPROM | Erasable Programmable Read Only Memory |
| EVM | Error Vector Magnitude |
| FDM | Frequency Division Multiplexing |
| FEC | Forward Error Control |
| FFT | Fast Frequency Transform |
| FM | Frequency Modulation |
| FPGA | Field Programmable Gate Array |
| GPS | Ground Positioning Satellite |
| HDL | Hardware Description Language |
| ICI | Intercarrier Interference |
| IEEE | Institute of Electrical and Electronics Engineers |
| IFFT | Inverse Fast Frequency Transform |
| JPG | Joint Photographic Experts Group |
| LAN | Local Area Network |
| MAC | Media Access Control |
| MBSP | Metric Based Symbol Predistortion |
| MP3 | MPEG-1 Audio Layer 3 |
| MPG | Moving Picture Experts Group |
| OFDM | Orthogonal Frequency Division Multiplexing |
| PA | Power Amplifier |
| PAPR | Peak to Average Power Ratio |
| PC | Personal Computer |
| PDA | Portable Digital Assistant |
| PTS | Partial Transmit Sequences |
| QAM | Quadrature Amplitude Modulation |
| RAM | Random Access Memory |
| RF | Radio Frequency |
| ROM | Read Only Memory |
| SIM | Subscriber Identity Module |
| SLM | Selective Mapping |
| SNR | Signal to Noise Ratio |
| TDMA | Time Division Multiple Access |
| USB | Universal Serial Bus |
| UWB | Ultra Wideband |
| WiFi | Wireless Fidelity |

-continued

| Term | Definition |
|---|---|
| WiMAX | Worldwide Interoperability for Microwave Access |
| WiMedia | Radio platform for UWB |
| WLAN | Wireless Local Area Network |
| WMA | Windows Media Audio |
| WMV | Windows Media Video |

DETAILED DESCRIPTION OF THE INVENTION

The present invention is a novel and useful apparatus for and method of reducing the backoff required for OFDM based transmitters. In wireless communication links using OFDM schemes, a large Backoff is required to maintain acceptable spectral mask and a good EVM. The reduced backoff mechanism is operative to reduce the backoff required while meeting spectral mask and EVM requirements imposed by wireless standards, for example. Reducing the required backoff thus permits both higher wireless range and reduced power consumption thus significantly improving battery life.

Although the mechanism of the present invention can be used in numerous types of communication systems, to aid in illustrating the principles of the present invention, the description of the reduced backoff mechanism is provided in the context of an OFDM based communication device. The reduced backoff mechanism of the present invention can be incorporated in a communication device such a multimedia player, cellular phone, PDA, etc. Although the invention is described in the context of a cellular phone, it is appreciated that the invention is not limited to the example applications presented, but that one skilled in the art can apply the principles of the invention to other communication systems as well (both wireless and wired) without departing from the scope of the invention.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMax, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device/Cellular Phone/PDA System

Figure 3:
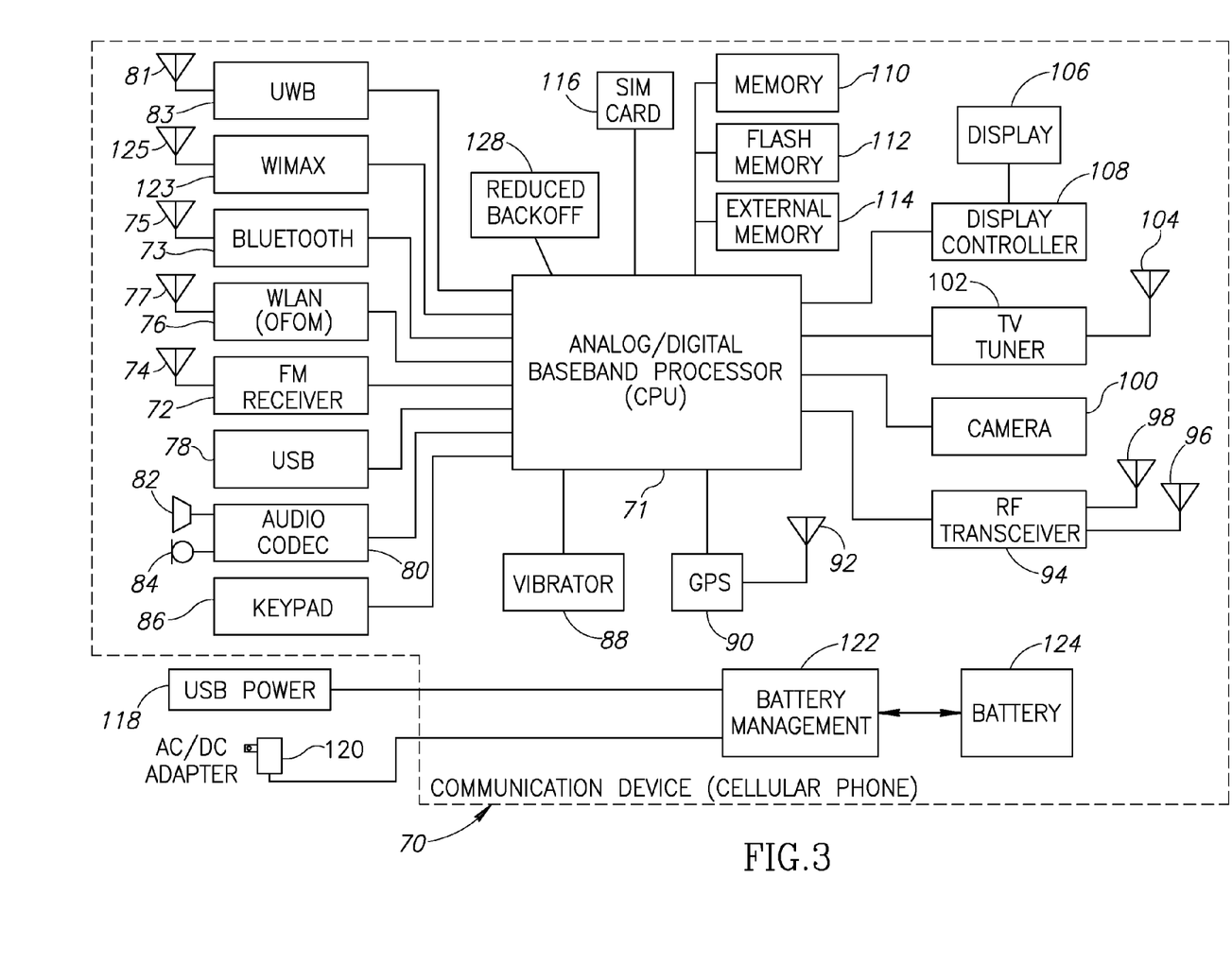
FIG. 3 is a block diagram illustrating an example communication device in more detail incorporating the backoff mechanism of the present invention.

A block diagram illustrating an example communication device in more detail is shown in FIG. 3. The communication device may comprise any suitable wired or wireless device such as multimedia player, mobile device, cellular phone, PDA, Bluetooth device, etc. For illustration purposes only, the communication device is shown as a cellular phone. Note that this example is not intended to limit the scope of the invention as the reduced backoff mechanism of the present invention can be implemented in a wide variety of communication devices.

The cellular phone, generally referenced 70, comprises a baseband processor or CPU 71 having analog and digital portions. The basic cellular link is provided by the RF transceiver 94 and related one or more antennas 96, 98. A plurality of antennas is used to provide antenna diversity which yields improved radio performance. The cell phone also comprises internal RAM and ROM memory 110, Flash memory 112 and external memory 114.

Several user interface devices include microphone 84, speaker 82 and associated audio codec 80, a keypad for entering dialing digits 86, vibrator 88 for alerting a user, camera and related circuitry 100, a TV tuner 102 and associated antenna 104, display 106 and associated display controller 108 and GPS receiver and associated antenna 92.

A USB interface connection 78 provides a serial link to a user's PC or other device. An FM receiver 72 and antenna 74 provide the user the ability to listen to FM broadcasts. WLAN radio and interface 76 and antenna 77 provide wireless connectivity when in a hot spot or within the range of an ad hoc, infrastructure or mesh based wireless LAN network. Bluetooth radio and interface 73 and antenna 75 provide Bluetooth wireless connectivity when within the range of a Bluetooth wireless network. Ultra Wideband (UWB) radio and interface 83 and antenna 81 provide UWB wireless connectivity when within the range of a UWB wireless network. Similarly, WiMAX radio and interface 123 and antenna 125 provide WiMAX wireless connectivity when within the range of a WiMAX wireless network. SIM card 116 provides the interface to a user's SIM card for storing user data such as address book entries, etc.

The cellular phone also comprises a reduced backoff block 128 adapted to implement the reduced backoff mechanism of the present invention as described in more detail infra. In operation, the reduced backoff block 128 may be implemented as hardware, software executed as a task on the baseband processor 71 or a combination of hardware and software. Implemented as a software task, the program code operative to implement the link establishment mechanism of the present invention is stored in one or more memories 110, 112 or 114.

Portable power is provided by the battery 124 coupled to battery management circuitry 122. External power is provided via USB power 118 or an AC/DC adapter 120 connected to the battery management circuitry which is operative to manage the charging and discharging of the battery 124.

Transmitter With Reduced Backoff Mechanism

Figure 4:
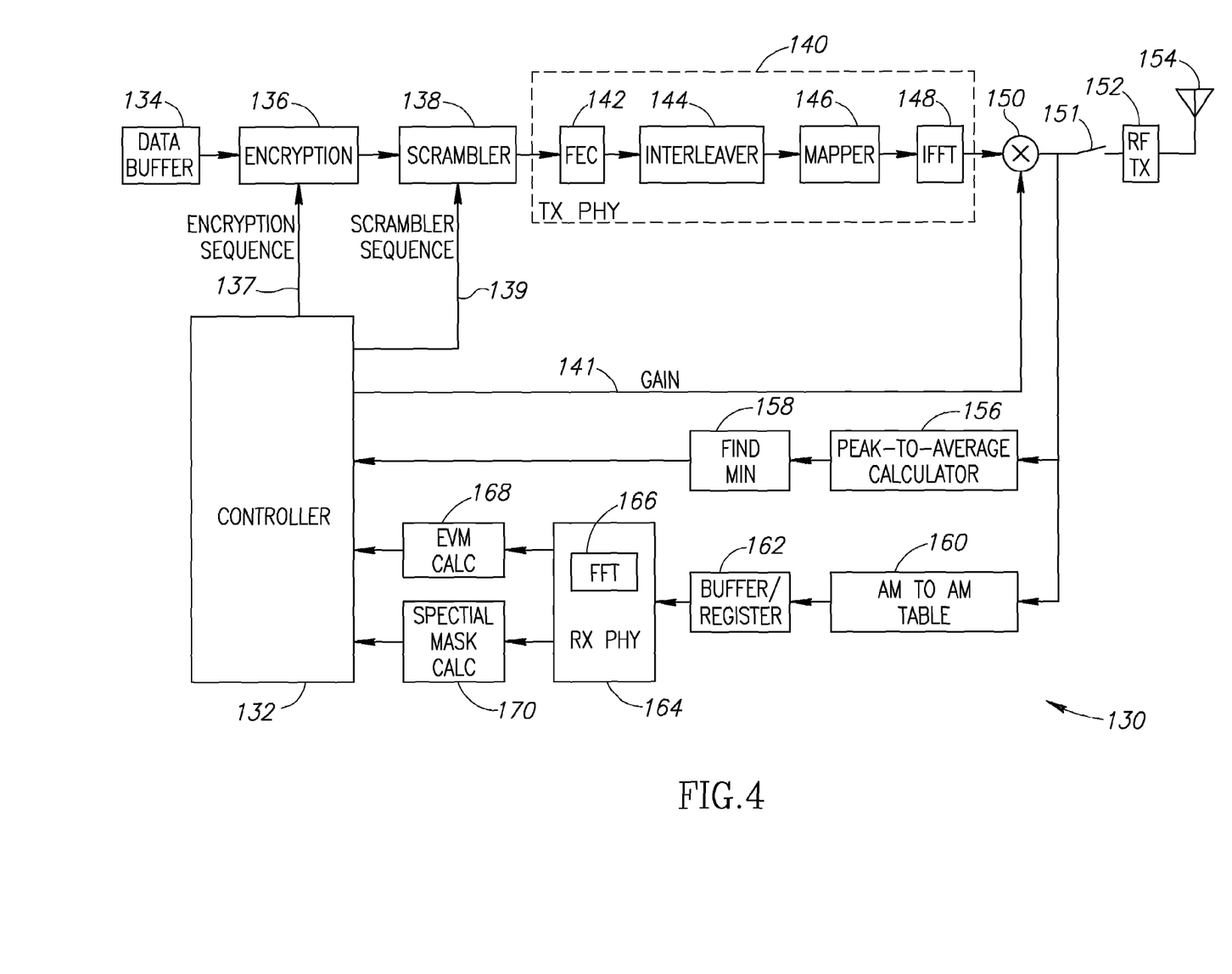
FIG. 4 is a block diagram illustrating an example transmitter incorporating the reduced backoff mechanism of the present invention.

A block diagram illustrating an example transmitter incorporating the reduced backoff mechanism of the present invention is shown in FIG. 4. The transmitter, generally referenced 130, comprises a controller 132, data buffer 134, encryption block 136, scrambler 138, TX PHY 140, gain multiplier 150, RF switch 151, RF TX (including power amplifier) 152, antenna 154, peak to average calculator 156, find min block 158, AM to AM table 160, buffer/register 162, RX PHY 164, EVM calculator 168 and spectral mask calculator 170. The TX PHY 140 comprises FEC 142, interleaver 144, mapper 146 and inverse fast frequency transform (IFFT) 148. The RX PHY 164 comprises FFT block 166.

In accordance with the present invention, for each packet to be transmitted, a search is performed on all possible scrambler sequences or encryption-sequences (i.e. initial value sequences) to find the sequence that would produce the lowest PAPR and thus would result in the lowest backoff value for the transmission of that particular packet. Note that there is no need to change both the encryption sequence and the scrambler sequence but rather only one of them. Therefore, if a particular implementation does deploy encryption for a specific link than the method is operate to select the optimum scrambler sequence. In the event encryption is used, the mechanism is operative to select the optimum encryption sequence while the scrambler sequence is held fixed to a particular value. In an alternative embodiment, both the encryption and scrambler sequences may be selected in sequential fashion using the mechanism of the present invention. Throughout this document, references to the scrambler sequence are intended to refer to either or both the scrambler sequence or the encryption sequence. As an aid to understanding the present invention, the description is provided in context of a search for a scrambler sequence. It is appreciated, however, that a search for the encryption sequence is contemplated as well.

In mechanism of the invention is operative to search different scrambler sequences (and/or different encryption sequences) for the best combination that allows the particular transmitted packet to pass any spectral mask and EVM requirements associated with a reduced backoff power amplifier. The search is performed by examining all (or a portion thereof) of the possible scrambler/encryption sequence hypotheses. Note that in most OFDM standards, the receiver is informed of the scrambler seed as well as the encryption seed used in the transmitter by way of dedicated fields in the packet header.

In order to optimize the performance of the transmitter, once the mechanism of the invention finds the optimum scrambler sequence, a search is performed for the maximum signal gain that still allows the transmission packet to meet the spectral mask and EVM requirements. After finding the scrambler sequence (and/or encryption sequence) and the maximum gain value, the transmitter PHY and the RF transmit circuit are activated and the packet is transmitted using the selected scrambler/encryption sequence.

The invention provides two efficient ways to implement the mechanism described supra. The first method involves a two stage scanning scheme whereby the best scrambler sequence is found first, followed by the optimum gain setting. The second method performs a two dimensional search to find the best scrambler sequence and gain setting simultaneously. Both these methods are described in more detail infra.

First Reduced Backoff Method

Figure 5A:
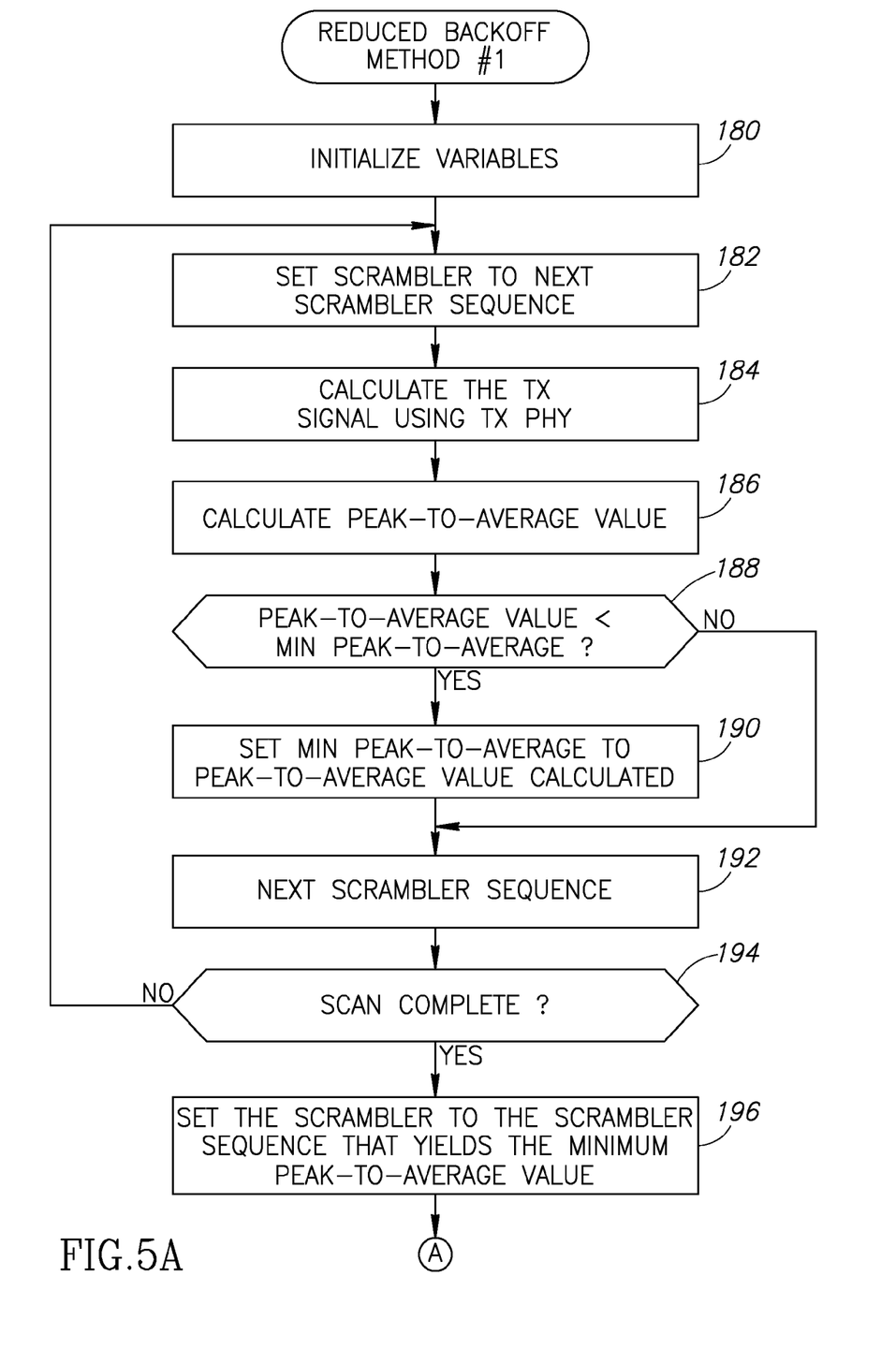
FIGS. 5A, 5B and 5C are a flow diagram illustrating a first reduced backoff method of the present invention.
Figure 5B:
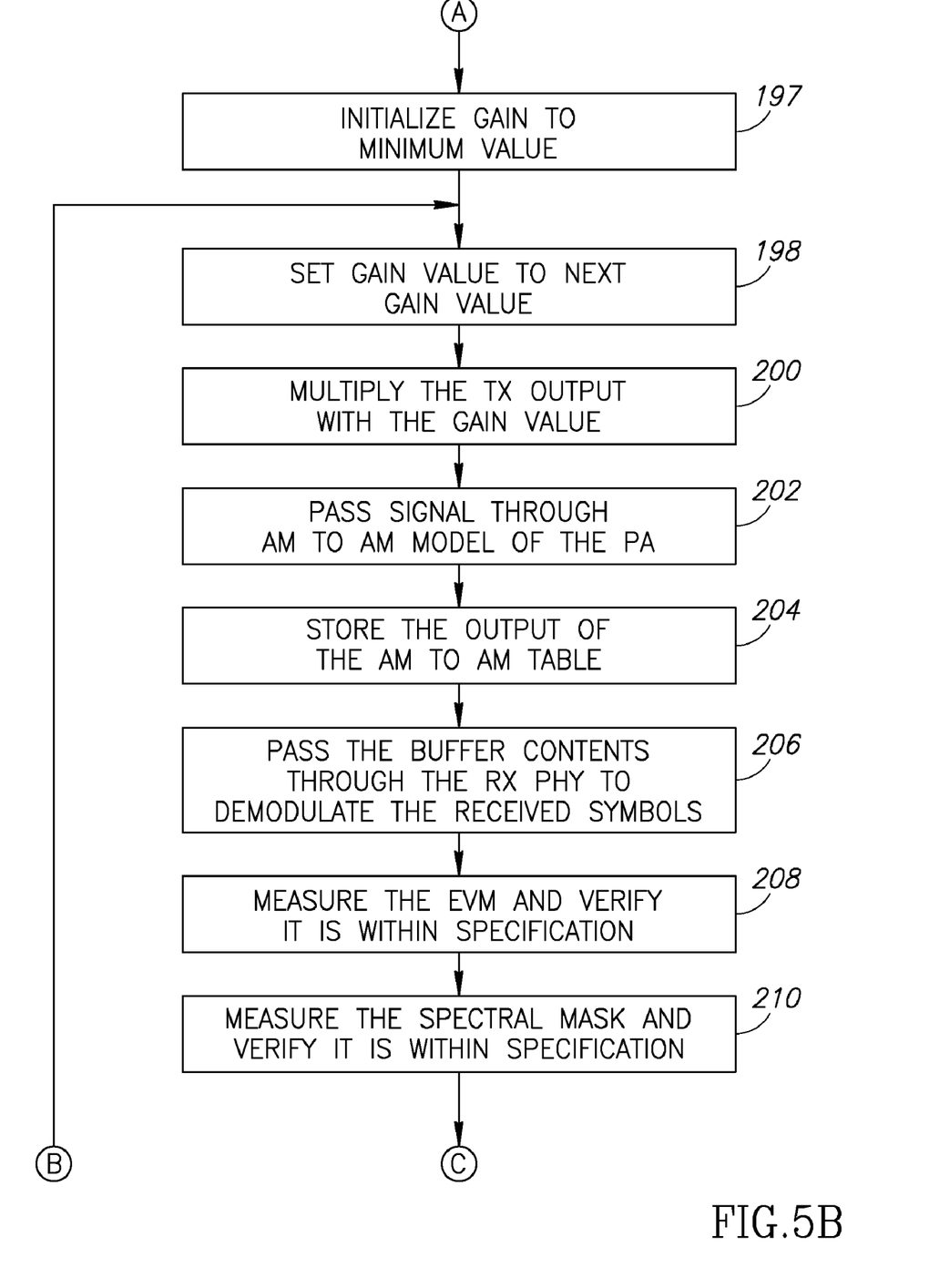
Figure 5C:
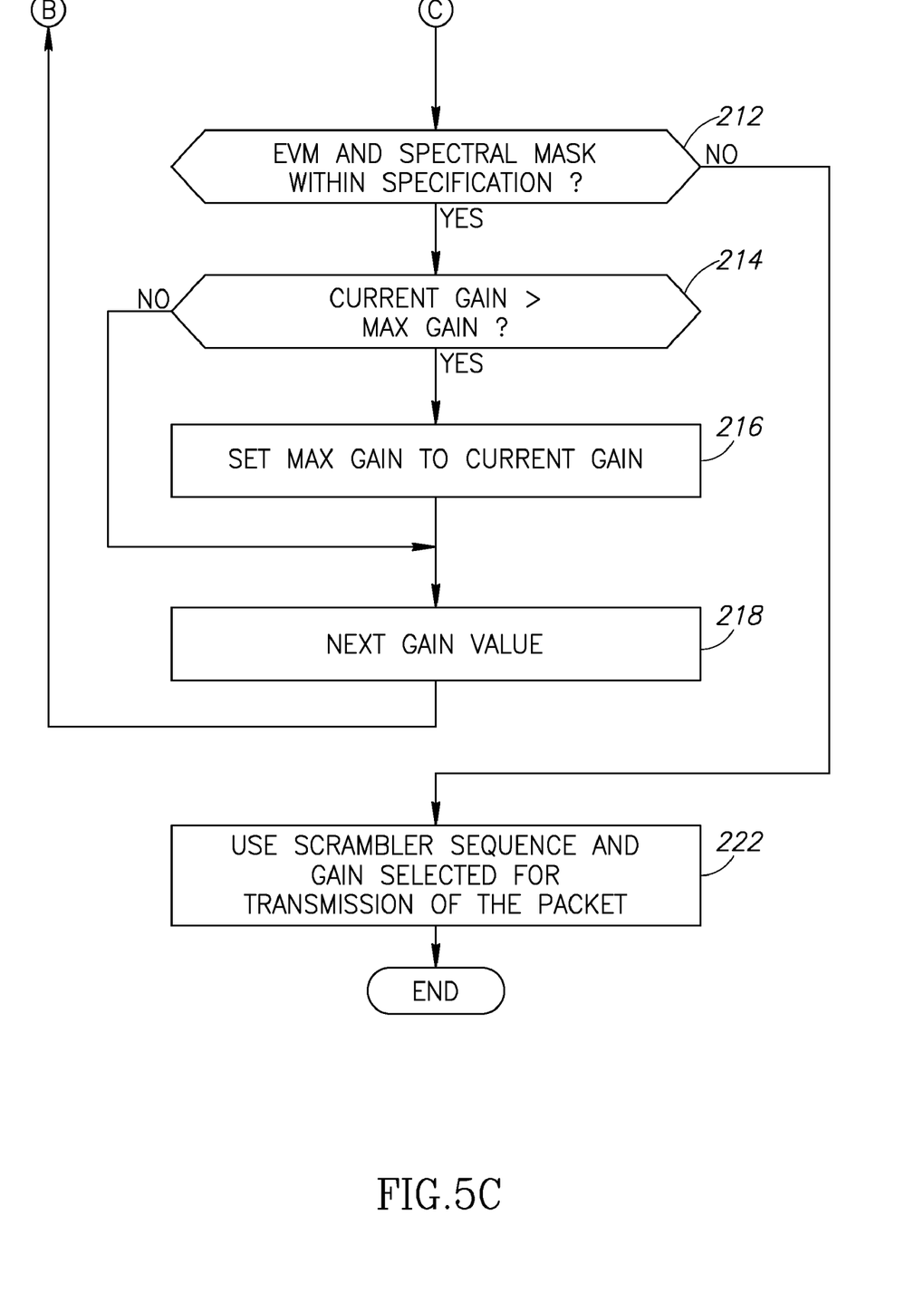

A flow diagram illustrating a first reduced backoff method of the present invention is shown in FIGS. 5A, 5B and 5C. The method of the invention is intended to be executed as software/firmware running on the controller 132 comprising any suitable processor or other hardware platform computing device. Alternatively, it can be implemented in hardware using the equivalent circuitry or a combination of hardware and software/firmware. Regardless of the implementation, the mechanism uses the TX PHY circuit to calculate what the transmitter output would be during a normal transmit operation. In accordance with the invention, during the search for the minimum backoff, the TX PHY circuit is configured such that the output thereof is not actually sent to the RF TX circuit and transmitted over the antenna. RF switch 151 is controlled by the controller 132 and is configured such that the transmitter output is not broadcast but rather input to the peak-to-average calculator 156 and AM to AM table 160 instead. After the scrambler sequence and encryption sequence (depending on the implementation) are determined, the transmitter output is output to the RF TX and the antenna 154.

In general, the method is implemented in two stages. First, all possible scrambler sequence candidate hypotheses are scanned until the lowest peak-to-average response is found.

Then, after finding the best scrambler sequence, the maximum gain of the signal that still meets the spectral mask and EVM requirements is found.

The following operations are repeated in order to find the best scrambler sequence that yields the lowest peak-to-average result: (1) calculate the signal to be transmitted using the OFDM TX circuit chain (usually implemented in hardware) and (2) calculate the peak-to-average of the generated packet. After the optimum scrambler sequence is found, the following steps are performed to find the maximum gain that still ensures meeting the EVM and spectral mask: (1) multiply the TX PHY output signal by the current gain candidate; (2) pass the gain adjusted signal through generalized AM to AM model of the PA; (3) store the output samples and than read them into the existing IFFT receiver to demodulate the received symbols; (4) measure the EVM of the RX PHY output and make sure that the desired specification is not violated; and (5) perform an FFT on the RX PHY output and measure the spectral mask to verify that it is not violated. The above four stages are repeated until the spectral mask and EVM is below an acceptable value (which is typically defined by the system specification).

Note that the method is performed for each packet to be transmitted supplied by the data buffer 143). With reference to FIGS. 4 and 5, first, any required variables are initialized (step 180). The scrambler is sequence is set to the next scrambler sequence candidate 134 as supplied by the controller (step 182). The TX signal that would have normally been transmitted is then determined by passing the output of the scrambler 138 through the TX PHY circuit 140 (step 184). The transmitter output is input to the peak-to-average calculator 156 which is operative to calculate the peak-to-average value of the transmitter output (step 186). The calculated peak-to-average value is then compared to the current value of the minimum peak-to-average variable (step 188). If it is smaller, then a new minimum has been found and the minimum peak-to-average value is set to the peak-to-average value just calculated (step 190). The next scrambler sequence is then determined (step 192) and the method returns to step 182 if the scrambler sequence scan is not yet complete (step 194). Note that the invention contemplates searching (i.e. scanning) through all possible scrambler (or encryption) sequences or, alternatively, searching through a subset of the possible sequences as described in more detail infra.

Note that if the encryption block 136 is present, the search is performed for the encryption sequence 137 rather than the scrambler sequence 139 and the scrambler sequence is fixed once determined. Once all the scrambler sequence candidates have been tested, the scan is complete (step 194) and the scrambler 138 is configured with the scrambler sequence that yields minimum peak-to-average value (step 196).

After the best scrambler sequence has been found, the maximum gain that still ensures meeting the EVM and spectral mask is then found. First, the gain value is initialized to a minimum value (step 197). The next gain value 141 supplied by the controller is used to configure the multiplier 150 (step 198). The output of the TX PHY previously calculated is multiplied by the candidate gain value via multiplier 150 (step 200). The signal output of the multiplier is then passed through the AM to AM table 160 which comprises a model of the power amplifier used in the RF TX circuit 152 (step 202). The output of the AM to AM table is stored in memory such as buffer/register 162 (step 204). The buffer contents are then passed through the RX PHY circuit 164 which is operative to perform a FFT 166 on the signal so as to demodulate the received symbol (step 206).

The EVM is then calculated via EVM calculator circuit 168 to ensure the EVM of the signal is within specification (step 208). The spectral mask is then measured and verified that it is within specification (step 210). If the EVM and the spectral mask are not within specification (step 212), the scan is considered complete and the scrambler sequence and the gain selected are used for the actual transmission of the packet (step 222). The switch 151 is now configured to output of the TX PHY signal to the RF TX 152 and antenna 154.

If the EVM and the spectral mask are within specification (step 212), than the gain value is increased and this new increased gain value is used and the EVM and spectral mask are checked again. Specifically, it is checked whether the current gain candidate is greater than a running maximum gain variable (step 214). If is it, the maximum gain variable is set equal tot the current gain setting (step 216). The next gain candidate is determined (step 218) and the method continues with step 198 to consider other gain candidates.

Second Reduced Backoff Method

Figure 6:
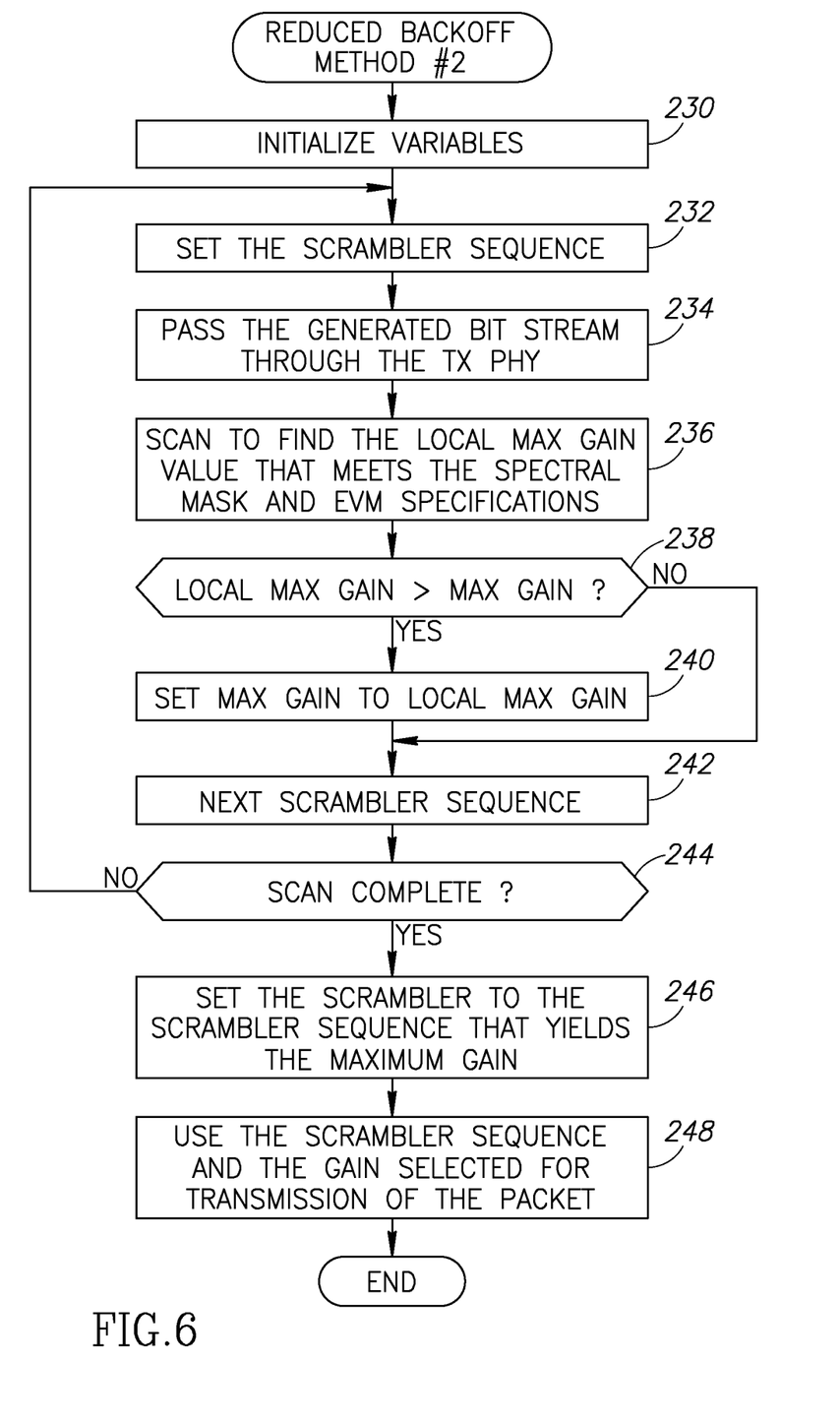
FIG. 6 is a flow diagram illustrating a second reduced backoff method of the present invention.

A flow diagram illustrating a second reduced backoff method of the present invention is shown in FIG. 6. This method is based on a single stage approach that employs a two dimensional search to find the best scrambler sequence and the maximal gain setting. In general, the search is performed by repeating the following steps for each of the checked scrambler-seed value: (1) setting a certain examined scrambler sequence; (2) transmitting the generated bit stream through the existing OFDM TX PHY hardware; (3) scanning to find the maximum gain value that still meets the spectral mask and EVM, wherein the spectral mask and EVM are calculated using the existing IFFT mechanism in the RX PHY circuit; and (4) the best scrambler sequence is selected as the one that yields the maximum gain value that still enables the transmitter to meet the spectral mask and EVM requirements.

With reference to FIGS. 4 and 6, first, any required variables are initialized (step 230). The scrambler sequence is then configured with the next scrambler sequence candidate (step 232). The bit stream generated by the scrambler is then input to the TX PHY circuit (step 234). The gain value is then scanned to find the local maximum gain value that meets the spectral mask and EVM specifications (step 236). If the local maximum gain determined is greater than the running maximum gain variable (step 238), then the maximum gain variable is set to the local maximum gain value just found (step 240). The next scrambler sequence is chosen (step 242) and the method continues with step 232 if the scan is not complete (step 244).

Thus, for each scrambler sequence candidate, the maximum gain setting that meets the spectral mask and EVM requirements is found. This maximum gain setting is referred to as a 'local maximum gain'. The maximum gain variable stores the running maximum of all local maximum gains found thus far.

Therefore, the scan is complete after all possible scrambler sequences have been tried (step 244). The scrambler is then configured with the scrambler sequence that yields the maximum gain (step 246). The scrambler sequence and the gain selected are used for actual transmission of the packet (step 248).

Simulation Results and Reduction in Required Search Space

Figure 7:
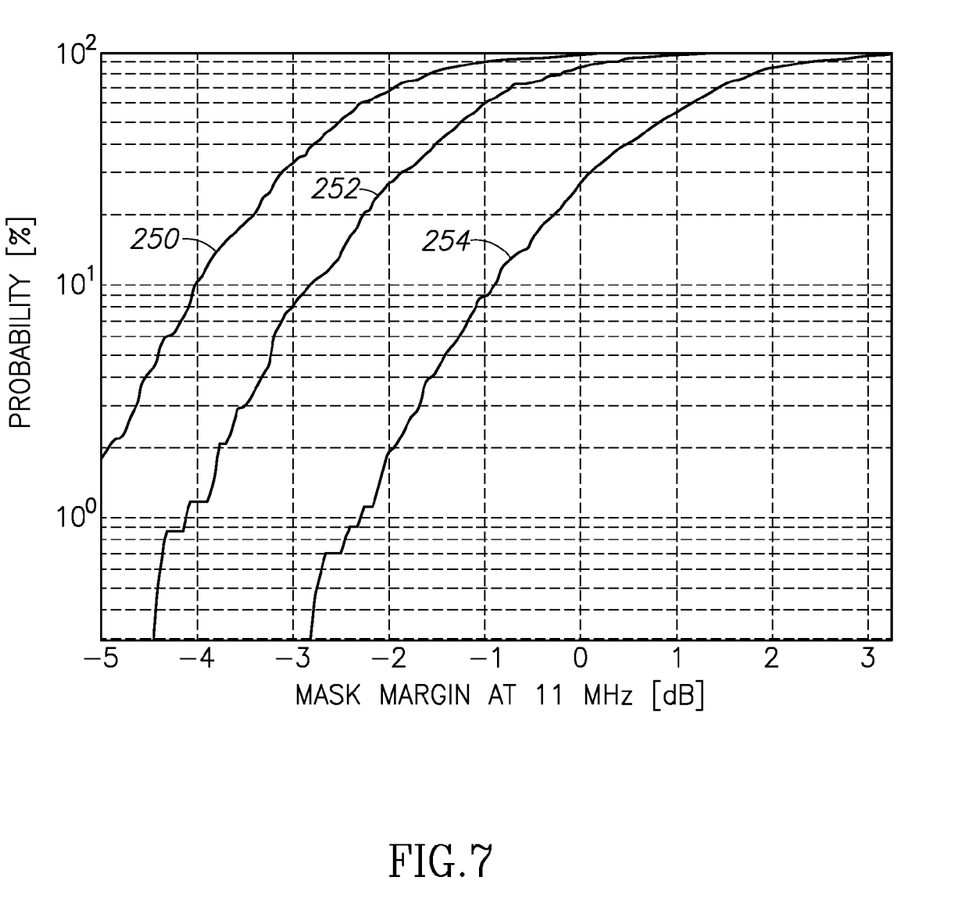
FIG. 7 is a diagram illustrating the cumulative distribution function of the mask margin.

In accordance with the invention, it is possible to significantly reduce the size of the search space required to find an optimum scrambler sequence and gain value. As shown by the following simulation of an example 802.11g or 802.11a communication system, it is possible to achieve a significant reduction of the backoff using a greatly reduced search space. A diagram illustrating the cumulative distribution function of the mask margin is shown in FIG. 7. This graph illustrates the statistics of a short packet in terms of meeting the 802.11g spectral mask requirements. The probability of meeting a particular mask margin for values of backoff of 1.2 dB, 3 dB and 4 dB are shown in curves 254, 252, 250, respectively. For example, for a backoff of 4 dB, a margin of 1 dB is maintained approximately 99.9% of the time. For a backoff of 1.2 dB a margin of 0 dB is maintained only 15% of the time. This 15% success rate for a very low backoff of 1.2 dB translates to maintaining the margin every 6.6 packets, while the remainder of the time, the margin is not met.

Figure 8:
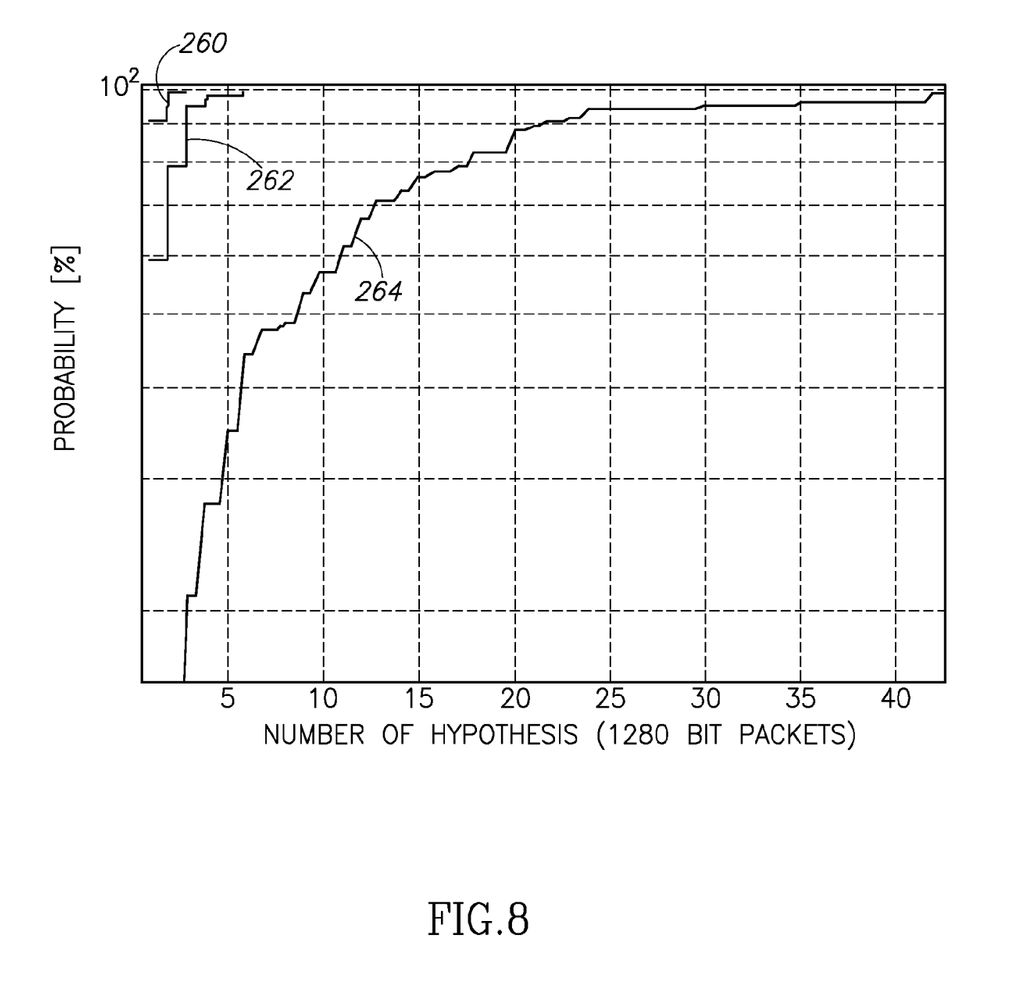
FIG. 8 is a diagram illustrating the cumulative distribution function of the number of hypotheses required to be scanned to meet the spectral mask requirements.

A diagram illustrating the cumulative distribution function of the number of hypotheses required to be scanned to meet the spectral mask requirements is shown in FIG. 8. This figure shows the actual statistics of the number of hypotheses (i.e. packets with different scrambler sequences) that would be required to be scanned in order to meet the spectral mask requirement. The probability of various time intervals for backoff values of 1.2 dB, 3 dB and 4 dB is shown in curves 264, 262, 260, respectively. As indicated in the figure, for example, about 20 scans (i.e. iterations), in which different scrambler or encryption sequence hypotheses are examined, are required in order to find a sequence(s) that pass the spectral mask with 90% probability. This means that in the case of a 1.2 dB backoff, approximately 20 hypotheses are required to be tested in order to meet the spectral mask requirement 90% of the time. In one embodiment, the scrambler sequence candidate hypotheses to be tested, are chosen randomly from the entire set of possible candidates. Other means of choosing the scrambler sequence candidate hypotheses are also contemplated by the present invention.

It is noted that for typical wireless LAN (WLAN) applications, a total of sixteen gain values must be searched. Considering that there are a maximum of 127 possible scrambler sequences, the total calculations required is 127 TX PHY calculations×16 FFT and EVM calculations. This introduces a significant computational load resulting in excessive delay (i.e. increased latency) and current consumption due to the long calculation times.

Using the simulation results described supra, however, the invention permits a reduction in the required calculations. In order to ensure a significant backoff reduction of 2.2 dB, for example, on 90% of the packets (having a length of 2000 bits for the average voice packet) only ten scrambler sequence hypotheses are required to be checked. Therefore only ten FFT, spectral mask and TX chain calculations are required to be performed. It is appreciated that this reduced number of calculations allows for a relatively simple implementation that results in low processing delay and current consumption.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of minimizing backoff for use in a transceiver incorporating a transmitter and receiver, said method comprising the steps of:

first scanning a plurality of sequence hypotheses;

for each sequence hypothesis and a data packet, first calculating a transmit circuit output signal and peak to average value thereof;

selecting the sequence that yields a minimum peak to average value;

for the selected sequence, second scanning all possible gain value hypotheses;

for each gain hypothesis, second calculating a receiver output signal and measuring the spectral mask and error vector magnitude (EVM) thereof; and selecting a maximum gain that does not violate spectral mask and EVM requirements.

2. The method according to claim 1, wherein said step of first calculating comprises calculating a transmit output signal by applying said sequence hypothesis to a transmit circuit.

3. The method according to claim 2, wherein said transmit circuit comprises a conventional orthogonal frequency division multiplexing (OFDM) transmit PHY circuit.

4. The method according to claim 1, wherein said step of second calculating comprises the steps of:

multiplying said transmit circuit output with a gain hypothesis to generate a gain adjusted output signal therefrom;

passing said gain adjusted output signal through a model of a power amplifier coupled to said transmitter to yield adjusted symbols therefrom; and passing said adjusted symbols through said receiver to yield said receiver output signal therefrom.

5. The method according to claim 1, wherein said sequence comprises a scrambler seed sequence.

6. The method according to claim 1, wherein said sequence comprises an encryption seed sequence.

7. The method according to claim 1, wherein said step of first scanning comprises the step of scanning a subset of possible sequence hypotheses.

8. The method according to claim 1, wherein said step of first scanning comprises the step of scanning a subset of possible sequence hypotheses randomly chosen from all possible sequence hypotheses.

9. A method of minimizing backoff for use in a transceiver incorporating a transmitter and receiver, said method comprising the steps of:

first scanning a plurality of sequence hypotheses;

second scanning a plurality of gain value hypotheses;

for each gain hypothesis and a data packet, first calculating a receiver output signal and measuring the spectral mask and error vector magnitude (EVM) thereof;

selecting a maximum gain that does not violate spectral mask and EVM requirements; and selecting the sequence that yields said maximum gain.

10. An apparatus for minimizing backoff in a transmitter, comprising:

a coder operative to generate a bitstream from an input data packet in accordance with a sequence input thereto;

a transmit circuit coupled to said coder;

a peak to average calculator operative to calculate a peak to average value of the output of said transmit circuit;

means for scanning a plurality of sequences through said coder; and software for selecting the sequence that yields a minimum peak to average value.

11. The apparatus according to claim 10, wherein said transmit circuit comprises an orthogonal frequency division multiplexing (OFDM) transmit PHY circuit.

12. The apparatus according to claim 10, wherein said sequence comprises a scrambler seed sequence.

13. The apparatus according to claim 10, wherein said sequence comprises an encryption seed sequence.

14. The apparatus according to claim 10, wherein said means for scanning comprises means for scanning a subset of possible sequence hypotheses.

15. The apparatus according to claim 10, wherein said means for scanning comprises means for scanning a subset of possible sequence hypotheses randomly chosen from all possible sequence hypotheses.

16. An apparatus for minimizing backoff in a transceiver having a transmitter and a receiver, comprising:
 a coder operative to generate a bitstream from an input data packet in accordance with a sequence input thereto, said bitstream input to said transmitter;
 a peak to average calculator operative to calculate a peak to average value of the output of said transmitter;
 a gain multiplier coupled to the output of said transmitter and operative to generate a gain adjusted signal in accordance with a gain value applied thereto;
 a table operative to generate a table output from said gain adjusted signal in accordance a model of the input/output characteristics of a power amplifier portion of said transmitter, said table output input to said receiver;
 means for measuring a spectral mask and error vector magnitude (EVM) of the output of said receiver;
 means for scanning a plurality of sequences through said coder and a plurality of gain values through said gain multiplier; and
 software for selecting the sequence and maximum value that yields acceptable spectral mask and EVM.

17. The apparatus according to claim 16, wherein said transmitter comprises an orthogonal frequency division multiplexing (OFDM) transmit PHY circuit.

18. The apparatus according to claim 16, wherein said receiver comprises an orthogonal frequency division multiplexing (OFDM) receive PHY circuit.

19. The apparatus according to claim 16, wherein said sequence comprises a scrambler seed sequence.

20. The apparatus according to claim 16, wherein said sequence comprises an encryption seed sequence.

21. A mobile communications device, comprising:
 a cellular radio;
 an orthogonal frequency division multiplexing (OFDM) transmitter comprising a scrambler;
 an OFDM receiver;
 a processor coupled to said transmitter and said receiver, said processor operative to:
  scan a plurality of scrambler sequence hypotheses;
  for each scrambler sequence hypothesis, calculate a transmit circuit output signal and peak to average value thereof;
  select the scrambler sequence that yields a minimum peak to average value;
  for the selected scrambler sequence, scan all possible gain value hypotheses;
  for each gain hypothesis, calculate a receiver output signal and measure the spectral mask and error vector magnitude (EVM) thereof;
  select the maximum gain that yields acceptable spectral mask and EVM; and
 means for transmitting packets via said transmitter utilizing said selected scrambler sequence and selected gain value.

* * * * *